UNITED STATES PATENT OFFICE.

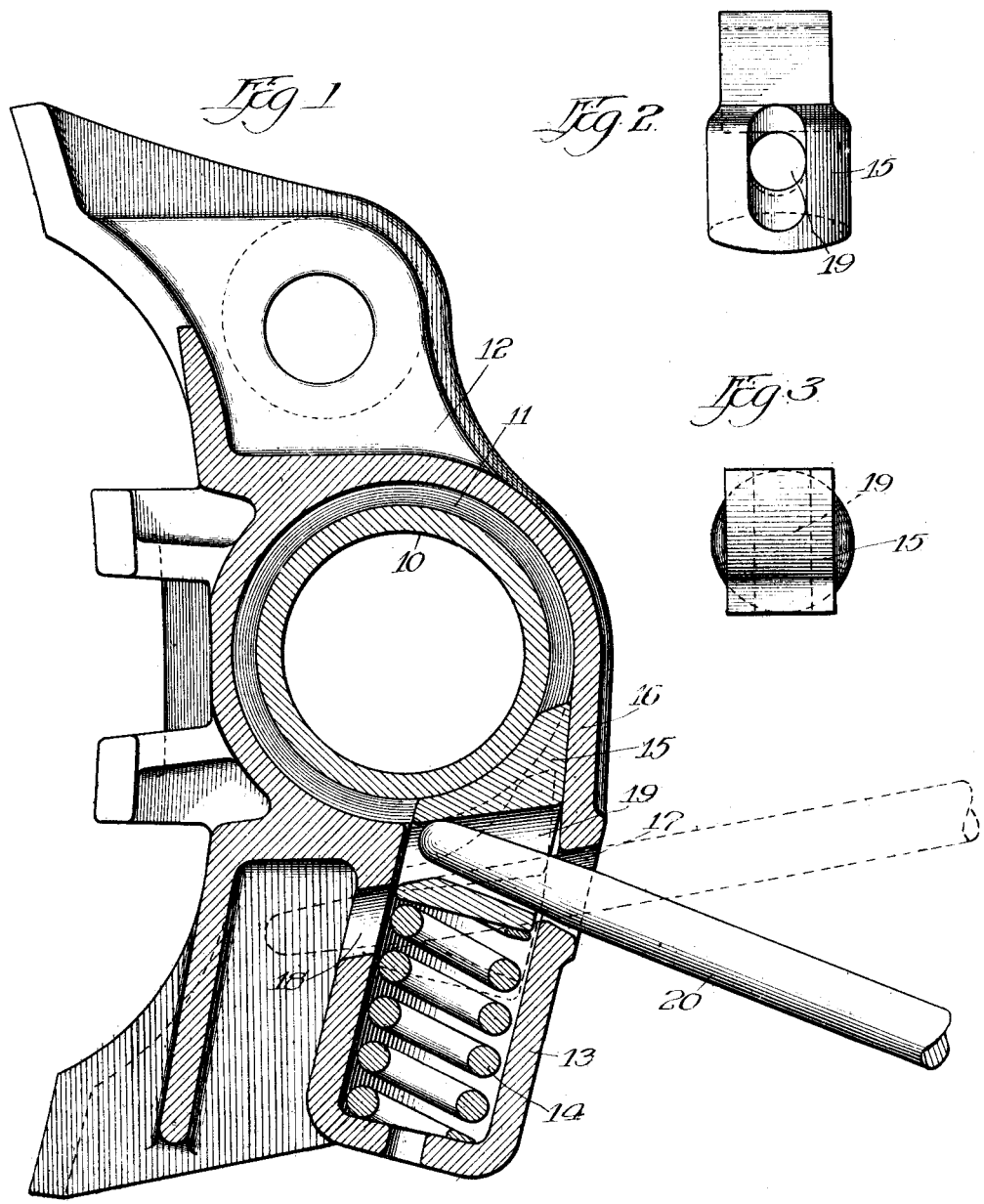

ARMAND H. PEYCKE, OF CHICAGO, ILLINOIS, ASSIGNOR TO AMERICAN STEEL FOUNDRIES, OF NEW YORK, N. Y., A CORPORATION OF NEW JERSEY.

BRAKE-HEAD.

1,140,058.  Specification of Letters Patent.  Patented May 18, 1915.

Application filed November 28, 1914. Serial No. 874,523.

*To all whom it may concern:*

Be it known that I, ARMAND H. PEYCKE, a citizen of the United States, and resident of Chicago, in the county of Cook and State of Illinois, have invented certain new and useful Improvements in Brake-Heads, of which the following is a specification.

My invention relates to brakes and has particular reference to a novel adjustable brake head.

It is customary to employ in certain classes of service brake heads which are angularly adjustable on the beams and which may be held in any of a plurality of adjusted positions. The means for so holding these heads may vary within wide limits but the space within which these adjusting means may be located is limited and therefore the form of the adjusting device must be restricted.

It has heretofore been proposed to provide wedges exerting force against the bearing, for holding the head in adjusted positions, these devices usually being actuated by screw means and adapted to exert considerable force. It has been thought desirable to provide a spring-advanced member by means of which a locking force may be continuously exerted. This, however, is not new, a common means for securing such result having been shown in the patent to Robischung, No. 485,823, now expired. The present construction differs from that in the provision of means for securing a partial wedging action by means of which the power of the spring is multiplied. Further, in the provision of extraneous means for actuating the spring-thrust block to remove it from engagement with the sleeve or bearing member.

An object therefore is to eliminate the possibility of the retraction of the locking block by an over-zealous attendant whose intentions are to tighten rather than to loosen the locking means.

The invention will be more readily understood by reference to the accompanying drawings, wherein, Figure 1 is a vertical section through a brake head and sleeve constructed in accordance with my invention; Fig. 2 is a side view of the locking block, and, Fig. 3 is a top plan view of the same.

Referring more particularly to the drawings it will be seen that I provide a sleeve 10, having a complete peripheral groove 11 therein. On the sleeve is mounted a brake head 12, having an elongated chamber 13, in its lower end extending downward at an angle to the axis of the head. Mounted within this chamber is a helical spring 14, which bears against and urges upward a locking block 15. This block is substantially triangular in vertical section, one edge of which is curved to the arc of curvature of the sleeve 10, and occupies the groove 11, in the sleeve. The opposite side is a plane surface and bears against the rear wall 16 of the head. Thus the spring tends to project the block upwardly and to wedge the same between the rear wall of the head and the sleeve. This block therefore tends to maintain the sleeve and head in constant engagement at the front portion of the head, or in other words, at the point through which the strains exerted in braking are directed. Openings 17, 18, are provided in the member 13, on opposite sides thereof, the opening 17, registering with a triangular opening 19, in the block 15. When the head is to be applied to the sleeve a bar such as shown at 20, is inserted in the openings and the locking block may be pried or forced downwardly until the bar moves to the dotted line position shown in Fig. 1. In this position the head may be slipped onto the sleeve and thereafter the bar removed, the block occupying the groove in the sleeve and preventing the removal in the head. This locking arrangement cannot be tampered with in any manner to permanently affect its action. Consequently the block cannot be accidentally withdrawn thus making possible the loss of the head.

Obviously modifications may be made in the construction shown and such modifications as are within the scope of my claims I consider within the spirit of my invention.

I claim:

1. In a device of the class described, the combination of a bearing having a groove therein, a head mounted on said bearing, and a spring-advanced locking-block, said block being wedge shaped and so located as to maintain said head and bearing in engagement on the inner side thereof, substantially as described.

2. In a device of the class described, the combination of a bearing having a peripheral groove, a head mounted on said bearing, a spring-advanced wedge-shaped locking block carried by said head and normally occupying the groove in said bearing, the arrangement being such that said head and bearing are maintained in engagement on the face side of said head, substantially as described.

3. In a device of the class described, the combination of a sleeve, a head mounted on said sleeve, a spring-advanced locking block carried by said head and bearing against said sleeve, said head having an opening for receiving a bar for prying said block out of engagement with said sleeve, substantially as described.

4. In a device of the class described, the combination of a sleeve, a head mounted on said sleeve, a spring-advanced locking block carried by said head and bearing against said sleeve, said head and block being provided with registering openings, the material surrounding the opening in said head acting as a fulcrum point, and a bar insertible through said openings and adapted to pry said block out of engagement with said sleeve, substantially as described.

ARMAND H. PEYCKE.

Witnesses:
CHAS. J. MADDOX,
T. B. J. TYLER.